(12) United States Patent
Bittroff et al.

(10) Patent No.: US 6,422,584 B1
(45) Date of Patent: Jul. 23, 2002

(54) HYDRAULIC SYSTEM FOR DAMPING THE MOTION OF ROTATION OF A SWIVEL JOINT BETWEEN TWO VEHICLE PARTS OF AN ARTICULATED VEHICLE, OF AN ARTICULATED BUS FOR EXAMPLE

(75) Inventors: Uwe Bittroff, Vellmar; Sven Kloppmann, Lohfelden; Hans-Uwe Schmelzer, Wangen; Stephan Klüttermann, Edermünde-Besse, all of (DE)

(73) Assignee: Hubner Gummi-und Kunstoff GmbH, Kassel (DE)

( * ) Notice: Subject to any disclaimer, the term of this patent is extended or adjusted under 35 U.S.C. 154(b) by 0 days.

(21) Appl. No.: 09/460,558

(22) Filed: Dec. 14, 1999

(30) Foreign Application Priority Data

Dec. 18, 1998 (DE) .......................... 298 22 472

(51) Int. Cl.⁷ .............................. B62D 53/06
(52) U.S. Cl. .................. 280/432; 280/455.1; 267/186; 91/437
(58) Field of Search ................. 267/186, 188; 188/152; 280/446.1, 483, 488, 432, 455.1, 426; 91/437; 60/468

(56) References Cited

U.S. PATENT DOCUMENTS

| | | | | |
|---|---|---|---|---|
| 4,313,616 A | * | 2/1982 | Howard ...................... 280/446 |
| 4,556,231 A | * | 12/1985 | Schultz ........................ 280/432 |
| 4,616,841 A | * | 10/1986 | Reichl ......................... 280/432 |
| 4,688,818 A | * | 8/1987 | Grassmuck ................. 280/432 |
| 4,720,118 A | * | 1/1988 | Schultz et al. .............. 280/432 |
| 4,756,543 A | * | 7/1988 | Cromnow et al. .......... 280/432 |
| 4,940,106 A | * | 7/1990 | Pedersen et al. ............ 180/139 |
| 5,137,107 A | * | 8/1992 | Uttenthaler ................. 180/235 |
| 5,174,597 A | * | 12/1992 | Uttenthaler ................. 280/432 |
| 5,832,807 A | * | 11/1998 | Rausch et al. ................ 91/420 |
| 6,199,378 B1 | * | 3/2001 | Aardema et al. ............. 60/468 |

* cited by examiner

*Primary Examiner*—Avraham Lerner
(74) *Attorney, Agent, or Firm*—Thomas R. Vigil; Welsh & Katz, Ltd.

(57) ABSTRACT

A hydraulic system for damping the motion of rotation of a swivel joint between two vehicle parts of an articulated vehicle, of an articulated bus for example, comprising a hydraulic damping device as well as an electrically triggerable proportional pressure control valve, whereas the proportional pressure control valve is arranged between the force side and the suction side of the damping device, a mechanical pressure control valve (103) being provided in addition to the proportional pressure control valve (104) in the conduit between the suction side and the force side of the damping device, and whereas a multiple-way valve is provided for the alternative drive of the pressure control valve (103) or of the proportional pressure control valve (104).

9 Claims, 6 Drawing Sheets

HYDRAULIC SYSTEM FOR DAMPING THE MOTION OF ROTATION OF A SWIVEL JOINT BETWEEN TWO VEHICLE PARTS OF AN ARTICULATED VEHICLE, OF AN ARTICULATED BUS FOR EXAMPLE

BACKGROUND OF THE INVENTION

CROSS-REFERENCE TO RELATED APPLICATIONS

1. Field of the Invention

This application claims priority from German Patent Application No. 298 22 472.0 filed Dec. 18, 1998.

2. Description of the Prior Art

A swivel joint as described above is well-known in the art. The prior art swivel joint comprises two joint members which may be pivotably connected to one another by an axle. The one joint member may hereby be linked directly to the one vehicle or vehicle part, whereas the other joint member may be connected to the vehicle or the vehicle part either directly by being pivotable around a horizontal running axle or indirectly via an intermediate link. Thanks to this axle, allowance is made for the fact that the swivel joint has to be able to yield to the nodding movements of the two vehicles relative to one another. According to a first embodiment, these swivel joints are provided on either side of the longitudinal axis of the vehicle or of the swivel joint with one hydraulic cylinder, whereas the hydraulic cylinders communicate on one hand with the one joint member and on the other hand with the vehicle. The damping members are hereby in angular alignment relative to the central longitudinal axis of the vehicles.

In another embodiment, a hydraulic cylinder with double-action is provided. It is fastened on the swivel joint across the longitudinal axis.

The electric drive of such a hydraulic system is known; an electrically triggerable proportional pressure control valve is hereby provided and is arranged between the force side and the suction side of the double-acting hydraulic cylinder or between the force side and the suction side of the two single-acting hydraulic cylinders. Such a proportional pressure control valve increases the flow resistance of the hydraulic medium. The consequence thereof is—as already explained—that the buckling motion of the joint is damped, particularly in a curve. Such a damping of the motion of rotation of the two joint members relative to one another is absolutely necessary, since otherwise the vehicle is hardly controllable. Such articulated vehicles are often designed as so-called pushers; a pusher is a vehicle whose last axle is driven. In case the hydraulic system fails to work, i.e. in case the motion of rotation of the two joint members relative to one another is not being damped, the vehicle may, under higher velocity, swerve at the least steering maneuvre, since the rear vehicle pushes the front vehicle aside via the lateral axis. The same occurs when driving a straight course when the road has rail grooves. In this case, the oscillations of the vehicle may build up. That means that the hydraulic system particularly fails to work when the electrically triggerable proportional pressure control valve has broken down. This is the case when the power supply of the vehicle has been interrupted since the control of the proportional pressure control valve occurs via electric signals. The electric drive and with it the degree of damping of this proportional pressure control valve depends on the state of the vehicle, whereas influences such as for example the speed of the vehicle and the position of the front car of the vehicle relative to the rear car of the vehicle are taken into account. If, consequently, the hydraulic system breaks down at higher speeds, because of an interruption in the electric circuit for example, it has to be guaranteed that the vehicle may at least be slowed down and head for the nearest repair shop at a considerably reduced speed without incurring any risk.

SUMMARY OF THE INVENTION

The object of the present invention is therefor to develop a hydraulic system of the type mentioned above that guarantees the controllability of the vehicle even in case the electric installation of a vehicle and with it the damping effect on the motion of rotation of the two joint members of a joint relative to one another break down due to the failure of the proportional pressure control valve.

The solution of this object is to provide in the conduit between the suction side and the force side of the damping device a mechanical pressure control valve in addition to the proportional pressure control valve, a multiple-way valve being provided for the alternative drive of the pressure control valve or of the proportional pressure control valve. Such a pressure control valve is designed in such a way that it may be adjusted to a predetermined pressure drop. That means that the mechanical pressure control valve may be adjusted to a determined minimum pressure which determines—as already explained—the degree of the damping.

According to two embodiments, the mechanical pressure control valve may either be arranged in parallel or in series relative to the electrically working proportional pressure control valve in the conduit between the suction side and the force side of the damping device.

The hydraulic damping device comprises more particularly a double-acting piston-cylinder arrangement or, according to a further embodiment, two piston-cylinder arrangements. Such a double-acting piston-cylinder arrangement installed across the longitudinal direction of the vehicle has the advantage of being more compact from a constructional point of view.

In order to guarantee that, when the proportional pressure control valve is not working any longer and is consequently open, the hydraulic path is led through the mechanical pressure control valve, a multiple-way valve and, more particularly a 3/2-way valve in case of a connection in parallel of proportional pressure control valve and mechanical pressure control valve or a 2/2-way valve in case of a connection of the pressure control valves in series.

Other advantageous features are described in the claims.

Another subject matter of the invention is a joint of an articulated vehicle with a hydraulic system as described above.

The invention is explained in more details according to the drawing.

DESCRIPTION OF THE PREFERRED EMBODIMENT(S)

Figure 5:
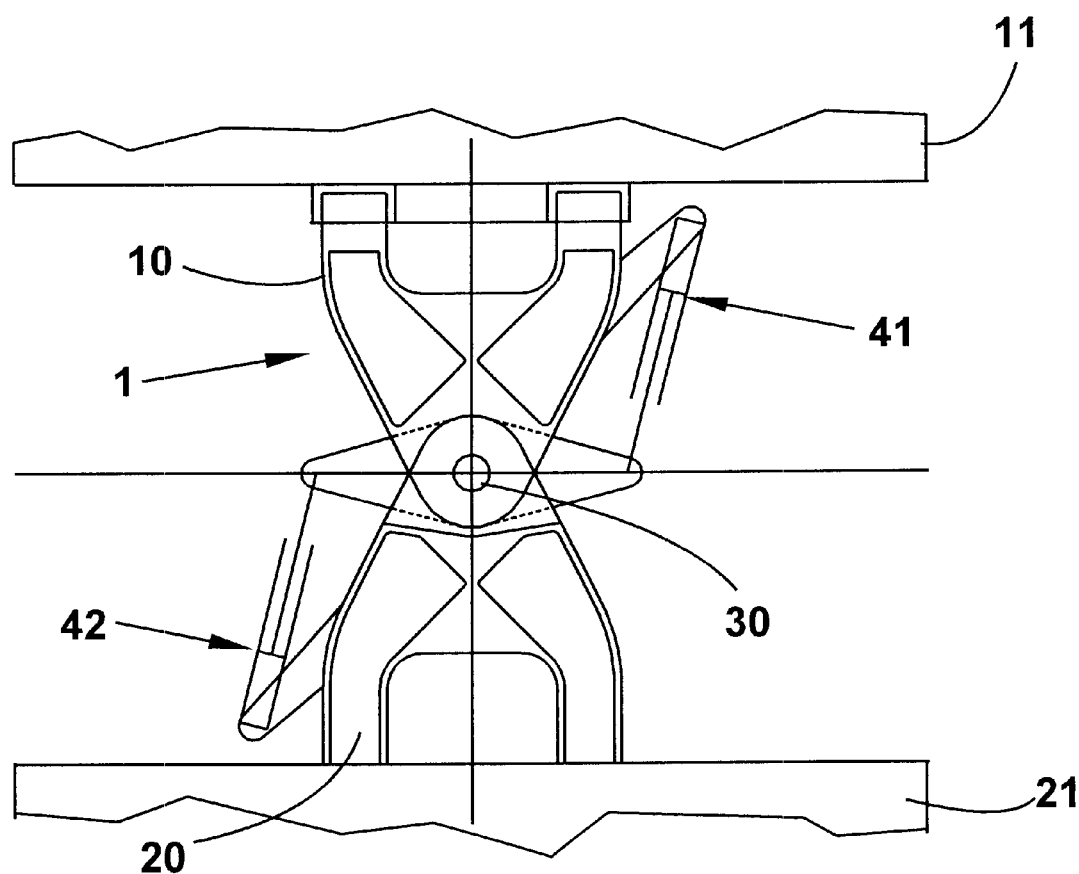
FIG. 5 is a diagram of a top view on a joint with two single-acting cylinders.
Figure 6:
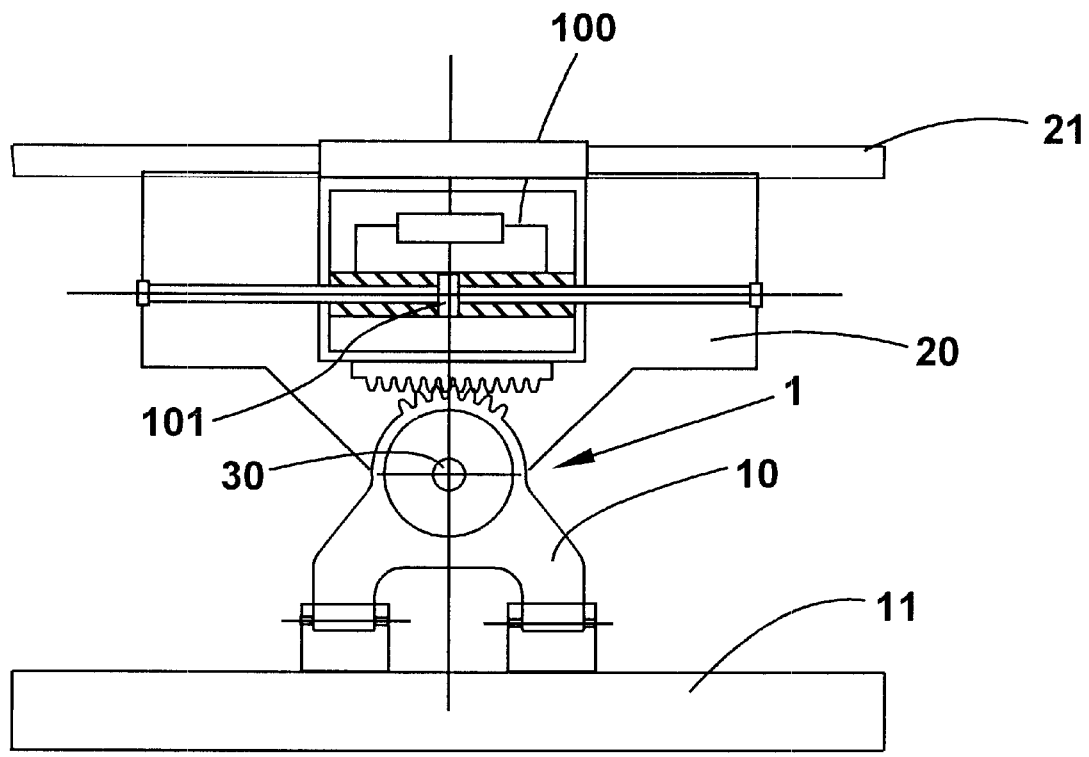
FIG. 6 is a diagram of a top view on a joint with a double-acting cylinder.

FIGS. 5 and 6 show a swivel joint referred to with reference number 1 and provided with two joint members 10, 20 which are pivotably connected together at the buckling point 30, by a pin for example. The joint member 20 may hereby be linked directly to the vehicle which is hinted at with reference number 21, whereas the joint member 10 is pivotably connected to the vehicle 11 by a horizontal running axle, if need be by an intermediate link. Such a connection is necessary in order to allow the nodding movements of the two vehicles 11, 21 relative to one another.

The subject matter of the invention is henceforth the connection, in fact the connection in series or the parallel connection of the proportional pressure control valve to the mechanical pressure control valve.

Figure 1:
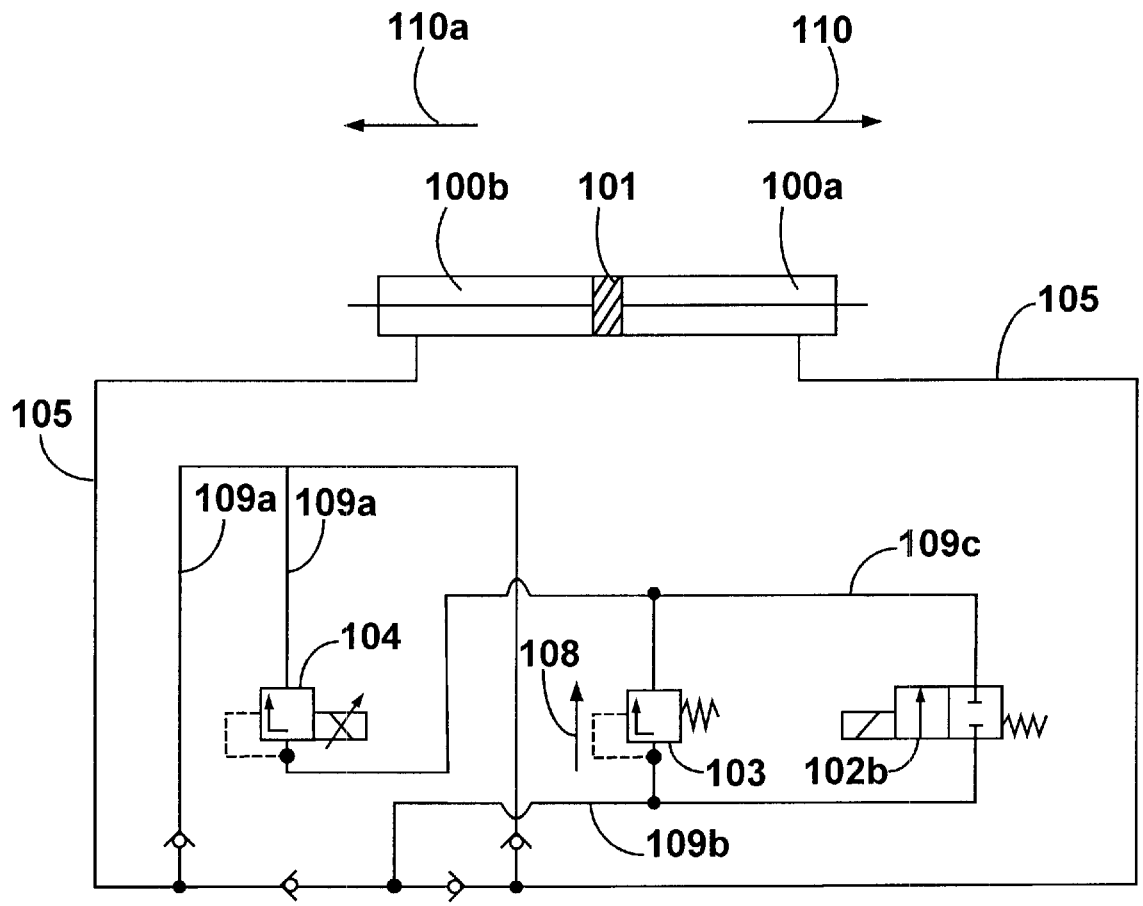
FIG. 1 is a diagram of the connection in series of the proportional pressure control valve with the mechanically triggerable pressure control valve with a double-acting cylinder.

As may be seen in FIG. 1, a connection in series is made with a double-acting cylinder. The cylinder, which is referred to as a whole with numeral 100, has two chambers 100a, 100b and communicates with the piston 101, with the proportional pressure control valve 104, with the 2/2-way valve 102b and with the mechanical pressure control valve 103 via the conduit 105.

For its functioning, the piston 101 of the double-acting piston-cylinder arrangement is assumed to run in the direction of the arrow 110. The pressure in the chamber 100a hereby increases, whereas the pressure in the chamber 100b decreases accordingly. As a consequence, the rate of flow of the fluid is normally limited by the proportional pressure control valve. Thus, the hydraulic fluid is led under less pressure via the conduits 105 and 109a to the chamber 100b of the double-acting piston cylinder. When the piston 101 is moving in the direction of the arrow 100a, the course of the fluid is the following: from the chamber 100b into the conduit 105 and through the conduit 109b to the 2/2-way valve 102b. There is no passage taking place through the valve 103 because this valve is short-circuited by the 2/2-way valve 102b.

In case the valve 104 breaks down, the functioning, while the piston is moving in the direction of the arrow 110, is as follows: in case of such a malfunction, the valve 104 is open; the fluid in the conduit 109b is led to the valve 103, the conduit 109c is blocked by the 2/2-way valve 102b. If the piston 101 is moving in the direction of the arrow 110a, the course of the fluid is inverted accordingly. The pressure control valve 103 is designed so that it only lets through when a predeterminable pressure of the fluid in the direction of the arrow 108 is attained. That means that, when the piston 101 is moving in the direction of the arrow 110a, the following occurs:

The fluid is pressed out of the chamber 100b and flows through the conduit 105 and 109 until it reaches the 2/2-way valve 102. The 2/2-way valve 102b blocks so that a pressure is building up in front of the pressure control valve 103. When the pressure exerted in the direction of the arrow 108 is high enough, the pressure control valve opens and the fluid passes through the non-activated, i.e. open proportional pressure control valve 104 before it reaches the chamber 100a. A damping occurs hereby due to the pressure drop at the valve 103.

Figure 2:
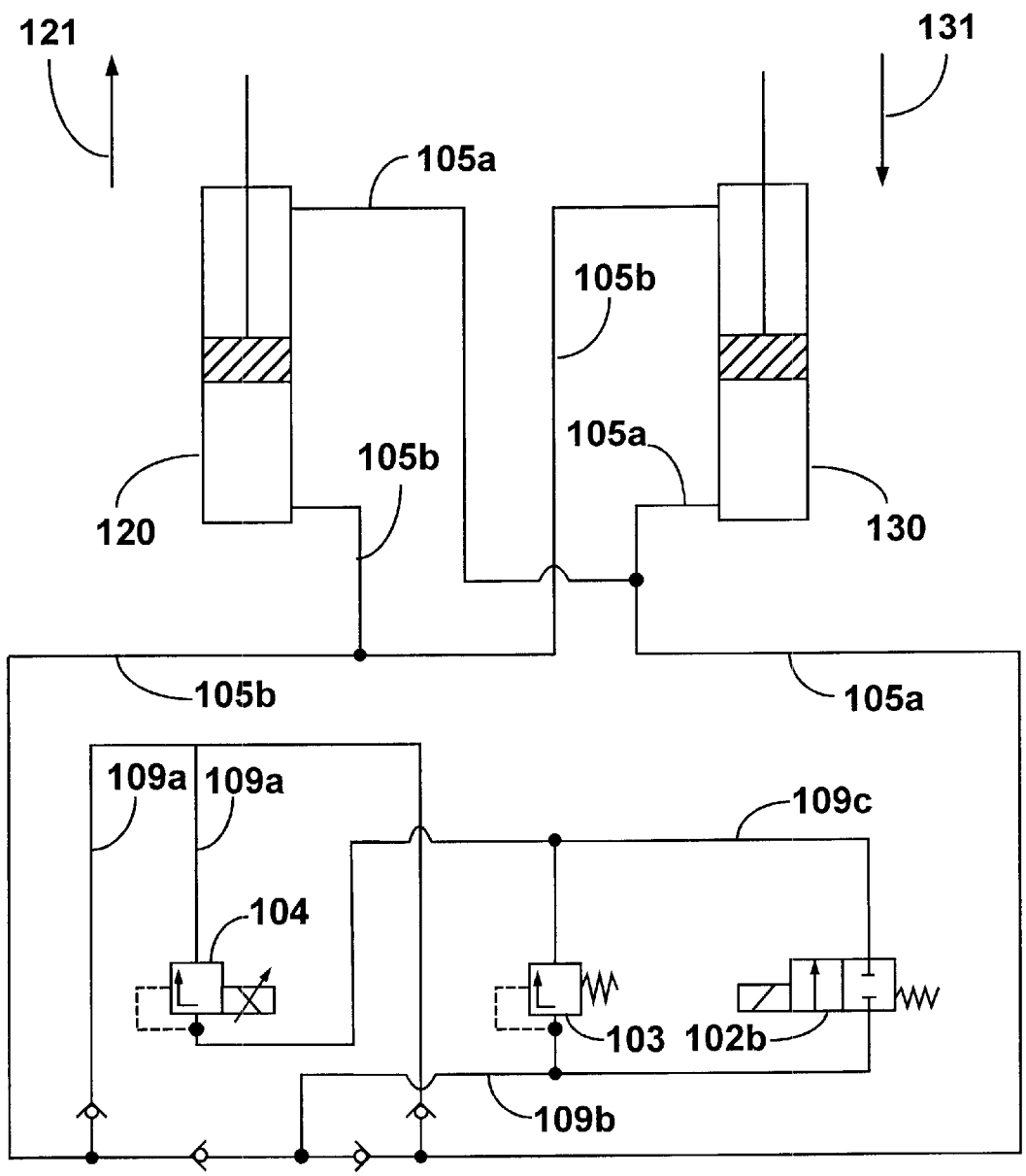
FIG. 2 is a diagram of a connection in series according to FIG. 1 with two single-acting cylinders.

The functioning of the connection in series of two cylinders according to FIG. 2 is as follows:

When pressure is building up in the direction of the arrow 121 of the piston-cylinder actuation 120 or in the direction of the arrow 131 of the piston-cylinder actuation 130, the fluid flows through the conduits 105a and 109b, to the 2/2-way valve 102b, through the conduit 109c to the proportional pressure control valve 104 on the other side (suction side) of the piston-cylinder arrangement 120, 130. Here too, the valve 103 is designed so that it only lets through the fluid when the pressure is high enough.

In case the proportional pressure control valve 104 fails, the flow of the fluid is as follows:

When the pressure is exerted in the direction of the arrow 121 or 131 of the piston-cylinder arrangement 120, 130, the pressure first increases inside the conduits 105a and 109b in front of the 2/2-way valve 102b, since the 2/2-way valve is closed to the fluid contained in the conduit 109b. As soon as a predetermined pressure is attained, the pressure control valve 103 opens so that the fluid may reach the corresponding suction side of the cylinder of the piston-cylinder arrangement 120, 130 by passing through the valve 103, and the opened proportional pressure control valve 104. The valve 103 is in that case functioning as a pressure control valve. In case of power failure, the valve 104 is open and the 2/2-way valve 102b is blocking.

Figure 3:
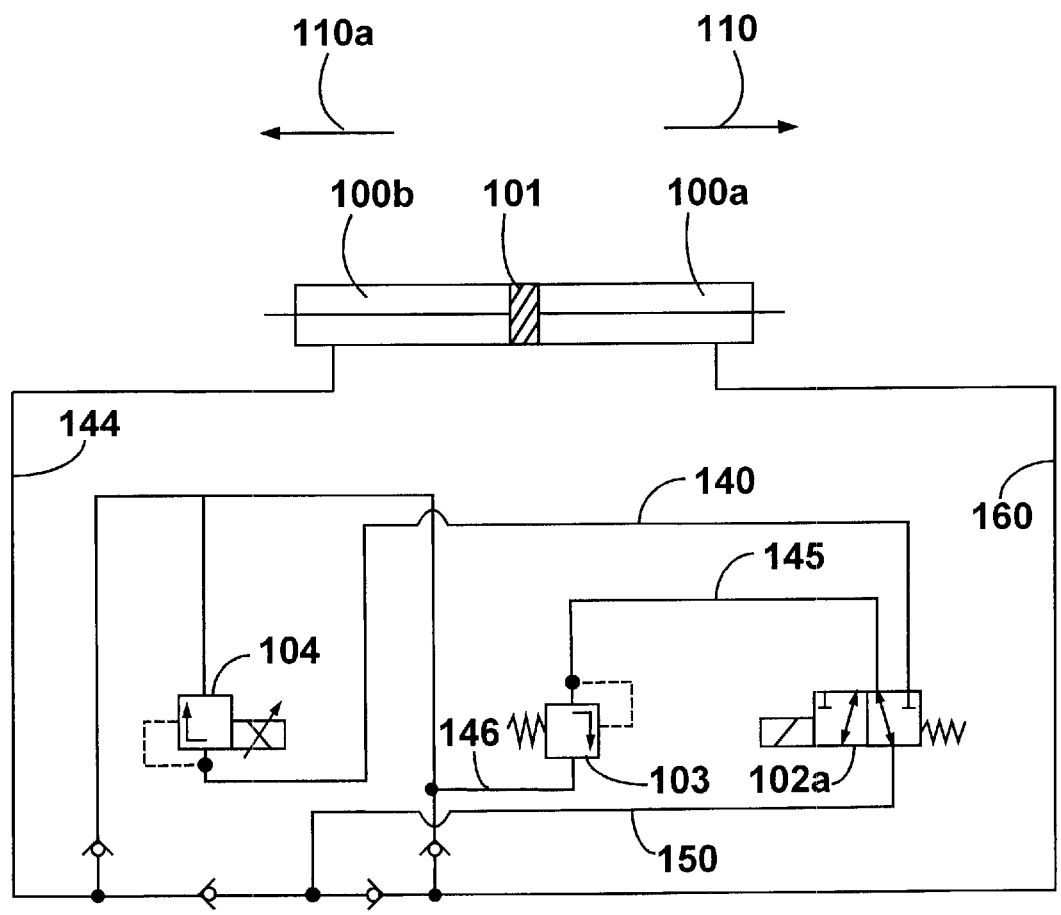
FIG. 3 is a diagram of a parallel connection of a hydraulic system with a double-acting cylinder.

The functioning of the parallel connection with a double-acting cylinder according to FIG. 3 is as follows:

For the parallel connection a 3/2-way valve 102a, a proportional pressure control valve 104 and a mechanical pressure control valve 103 are provided.

When the proportional pressure control valve 104 is working and the piston 101 of the double-acting piston-cylinder 100 is moving in the direction of the arrow 110, the fluid flows from the chamber 100a through the 3/2-way valve 102a, through the conduit 140, through the proportional pressure control valve 104 onto the other side (suction side) of the respective piston-cylinder arrangement.

If now the proportional pressure control valve 104 fails, the conduit 140 is blocked by the 3/2-way valve 102a, so that the fluid reaches the chamber 100b by passing, starting from the chamber 100a, through the conduits 145 and 146 and through the mechanical pressure control valve 103.

The same is true in reverse direction when the piston 101 is moving in the direction of the arrow 110a in case the valve 104 is not working, that means when it is open. Here, the fluid flows through the conduit 150 and 145 towards the valve 103 and through the conduit 146 into the chamber 100a.

When the valve 104 is working and the piston 101 is moving in the direction of the arrow 110a, the hydraulic medium flows from the chamber 100b through the conduits 144, 150 and 140 through the valve 104 through the conduit 160 into the chamber 100a. The conduit 145 is hereby blocked by the 3/2-way valve 102a.

Figure 4:
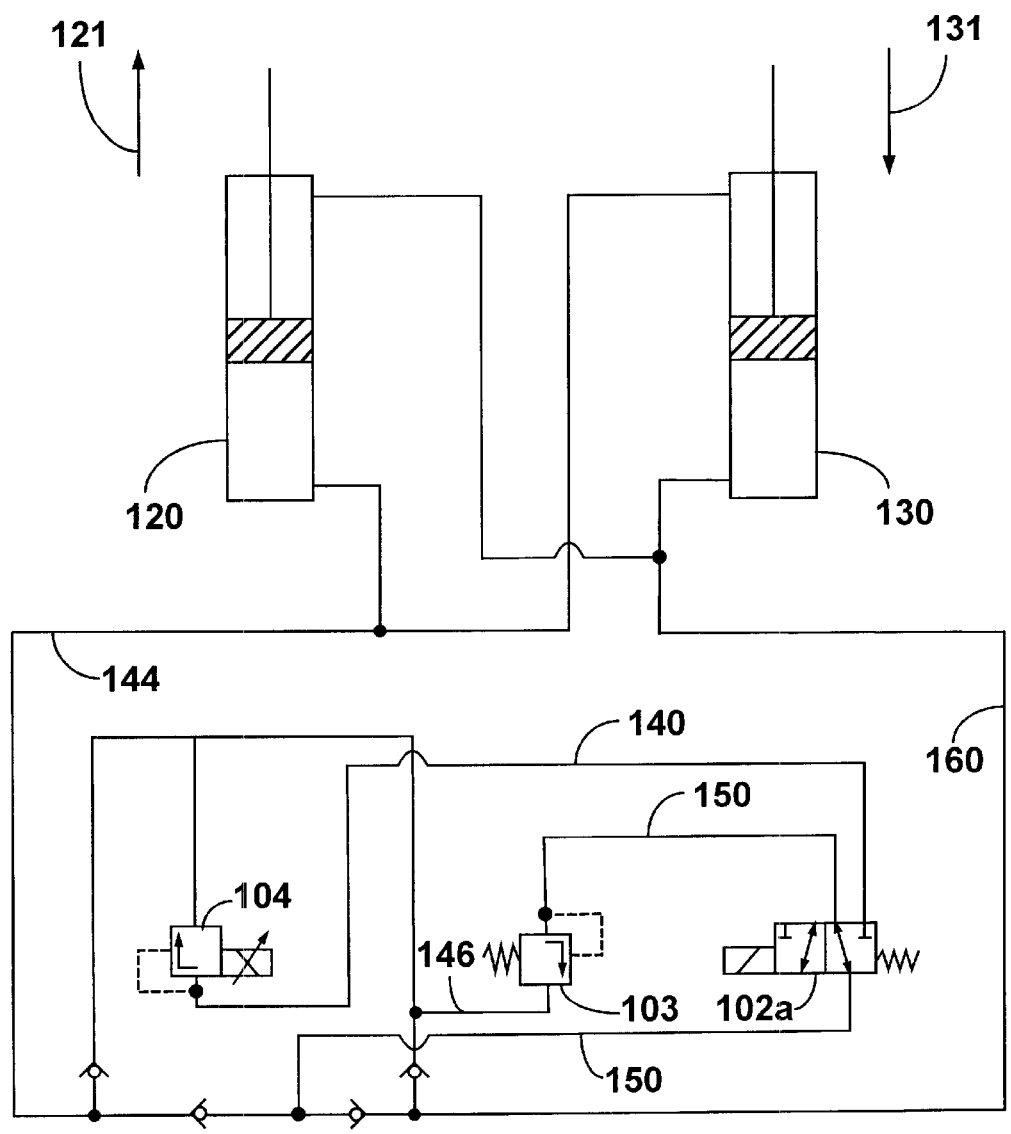
FIG. 4 is a diagram of a parallel connection according to FIG. 1 with two single-acting cylinders.

The same is occurring in FIG. 4 where two single-acting piston-cylinder arrangements are provided.

We claim:

1. Hydraulic system for damping the motion of rotation of a swivel joint between two vehicle parts of an articulated vehicle, comprising a hydraulic damping device as well as an electrically triggerable proportional pressure control valve (104), the proportional pressure control valve being arranged between a force siae and a suction side of the damping device, characterized in that, in the conduit between the suction side and the force side of the damping device, an emergency mechanical pressure control valve (103) is provided in addition to the normally operating, electrically triggerable proportional pressure control valve (104), a multiple-way valve being provided for the alternative drive of the mechanical pressure control valve (103) or of the normally operating, electrically triggerable proportional pressure control valve (104).

2. Hydraulic system according to claim 1, characterized in that the mechanical pressure control valve (103) is arranged in parallel relative to the electrically triggerable proportional pressure control valve (104).

3. Hydraulic system according to claim 1, characterized in that the mechanical pressure control valve (103) is arranged in series relative to the electrically triggerable proportional pressure control valve (104).

4. Hydraulic system according to claim 3, characterized in that, the mechanical pressure control valve (103) is connected in series with the proportional pressure control valve (104) and that the multiple-way valve (102b) is arranged parallel to the mechanical pressure control valve (103).

5. Hydraulic system according to claim 2, characterized in that, in the case the mechanical pressure control valve (103) is connected in parallel with the proportional pressure control valve (104) and that the multiple-way valve (102a) is added to the mechanical pressure control valve (103, 104) and the proportional pressure control valve (104).

6. Hydraulic system according to claim 4, characterized in that the hydraulic damping device comprises a double-acting piston-cylinder arrangement (100).

7. Hydraulic system according to claim 1, characterized in that the hydraulic damping device comprises two piston-cylinder arrangements (120, 130).

8. Hydraulic system according to claim 5, characterized in that the hydraulic damping device comprises a double-acting piston-cylinder arrangement (100).

9. Swivel joint of an articulated vehicle characterized by a hydraulic system according to claim 1.

* * * * *